United States Patent
Ando et al.

[11] Patent Number: 5,993,617
[45] Date of Patent: Nov. 30, 1999

[54] FUNCTIONAL PRODUCT

[75] Inventors: Eiichi Ando, Kamisu-machi, Japan; Koichi Suzuki, Bruxelles, Belgium; Junichi Ebisawa, Yokohama, Japan; Susumu Suzuki, Yokohama, Japan; Hirokazu Seki, Yokohama, Japan

[73] Assignee: Asahi Glass Company Ltd., Tokyo, Japan

[21] Appl. No.: 08/968,138

[22] Filed: Nov. 12, 1997

Related U.S. Application Data

[63] Continuation of application No. 08/583,528, Jan. 5, 1996, abandoned, which is a continuation of application No. 08/267,402, Jun. 29, 1994, abandoned, which is a continuation-in-part of application No. 07/995,829, Dec. 23, 1992, abandoned.

[30] Foreign Application Priority Data

Dec. 26, 1991 [JP] Japan ..................... 3-357811

[51] Int. Cl.$^6$ ..................................... C23C 14/34
[52] U.S. Cl. .................. 204/192.27; 204/192.15; 204/192.23; 204/192.26; 204/192.28; 204/192.29; 204/298.13
[58] Field of Search ............. 204/192.15, 192.23, 204/192.26, 192.27, 192.28, 192.29, 298.13

[56] References Cited

U.S. PATENT DOCUMENTS

| | | | |
|---|---|---|---|
| 5,110,637 | 5/1992 | Ando et al. | 428/34 |
| 5,201,926 | 4/1993 | Szczyrbowski et al. | 204/192.27 |
| 5,209,835 | 5/1993 | Makino et al. | 204/192.16 |
| 5,264,286 | 11/1993 | Ando et al. | 428/432 |

FOREIGN PATENT DOCUMENTS

| | | |
|---|---|---|
| 0 331 201 | 9/1989 | European Pat. Off. . |
| 0331201 | 9/1989 | European Pat. Off. . |

OTHER PUBLICATIONS

J. Vossen et al, "Thin Film Processes", Academic Press, 1978, pp. 14–16.

*Primary Examiner*—Rodney McDonald
*Attorney, Agent, or Firm*—Oblon, Spivak, McClelland, Maier & Neustadt, P.C.

[57] ABSTRACT

A functional product having a transparent oxide layer and a silver layer alternately laminated on a transparent substrate in a total number of (2n+1) layers, where $n \geq 1$, wherein an oxide film whose major component is an oxide containing tin and silicon, is formed on the outermost layer.

20 Claims, 2 Drawing Sheets

FUNCTIONAL PRODUCT

This application is a Continuation of application Ser. No. 08/583,528, filed on Jan. 5, 1996, now abandoned, which is a Continuation of application Ser. No. 08/267,402, filed on Jun. 29, 1994, now abandoned, which is a Continuation-In-part of application Ser. No. 07/995,829, filed on Dec. 23, 1992, now abandoned.

BACKGROUND OF THE INVENTION

1. Field of the Invention

The present invention relates to a functional product, particularly to a functional product excellent in durability and appearance.

2. Discussion of Background

Conventionally, a Low-E glass (low emissivity glass), or a heat ray shielding glass (normally called a heat ray reflecting glass) wherein a multi-layer film is formed on a glass substrate having a large area by the magnetron sputtering method, has been employed. Since the glass employed in construction is excellent in energy conservation effect and design performance, it has considerably been prevailing in recent years.

The Low-E glass made by a sputtering method, is normally composed of three layers of an oxide film/a silver film/an oxide film. Since this type of Low-E glass employing silver, has a problem in durability, it cannot be employed in a single plate glass, and is used in a form of double glazing or laminated glass. For a windshield glass and a rear glass of an automobile, a low emissivity glass coated with a three-layer film composed of zinc oxide film/silver film/zinc oxide film made by a sputtering method on the side of a surface thereof for adhesion to form a laminated glass, is reduced into practice.

The heat ray shielding glass is produced by a continuous production line including steps of cleaning the substrate, sputtering for film formation and post-cleaning. In recent years, mounting of the substrate on the line and withdrawal of the product from the line tend to be automated.

However, the Low-E glass employing silver is poor in the scratch resistance of the film, and a due care is required in its handling until it is assembled into a double glazing or laminated glass. Therefore, it has been difficult to automate its production. Specifically, in a usual automatic production, a resin powder is usually sprayed between the glass products to avoid adhesion of the glass products to each other at the time of withdrawal of the glass products. However, in the case of the Low-E glass employing silver, the film surface is likely to be scratched by this powder, since the scratch resistance of the film is poor. Accordingly, with the Low-E glass, it has been difficult to automate the withdrawal of the glass products, and such withdrawal has been manually carried out, and it has been common to insert paper or the like instead of the powder between the glass products. Therefore, it has been difficult to shorten the production time, and the production cost has been substantial.

It is an object of the present invention to solve such problems and to provide a Low-E glass employing silver, whereby the scratch resistance of the film surface is improved, and withdrawal of the glass products can be automated.

SUMMARY OF THE INVENTION

The present invention provides a functional product having a transparent oxide layer and a silver layer alternately laminated on a transparent substrate in a total number of (2n+1) layers, where $n \geq 1$, wherein an oxide film whose major component is an oxide containing tin and silicon, is formed on the outermost layer.

FIGS. 1 through 4 are sectional diagrams of Examples of a functional product of this invention. However, this invention is not necessarily restricted to these Examples. A reference numeral 1 designates a transparent substrate such as glass or plastic, 2, a transparent oxide layer, 3, a silver layer, 4, a barrier layer formed between the silver layer 3 and a transparent oxide layer 2 formed thereon, and 5, an oxide film (hereinafter referred to as a STO film) whose major component is an oxide containing tin and silicon.

In the present invention, n is not particularly limited, and the larger the value of n, the higher the improvement of the Low-E property. However, the cost increases accordingly. Therefore, a system where n=1 or n=2 is preferably employed so long as a practically adequate Low-E property is obtainable.

The silver layer 3 may contain, in addition to silver (Ag), an element such as palladium (Pd), aluminum (Al) or copper (Cu). The thickness of the silver layer is not particularly limited, but is usually preferably from 5 to 25 nm, more preferably from 8 to 15 nm. If the thickness is less than 5 nm, the Low-E property tends to be inadequate, and if it exceeds 25 nm, the durability of the functional product of the present invention tends to deteriorate.

The barrier layer 4 is provided to prevent oxidation of silver and may, for example, be Zn, Ti, Cr, Sn, Ni, stainless steel, Ni—Cr, $SiN_x$, $AlN_x$ or BN, although it is not particularly limited. Particularly preferred is Zn. The thickness of the barrier layer 4 is preferably from 1 to 5 nm. If the thickness is less than 1 nm, the anti-oxidation function tends to be inadequate, and if it exceeds 5 nm, the transmittance of the functional product of the present invention tends to deteriorate.

The oxide films of 5 (hereinafter, may be called STO films), may be provided with an oxide containing tin and silicon as the major component, or may contain other elements such as zirconium, titanium, tantalum, bismuth and the like. The ratio of tin is to be 5 through 95% in atomic ratio, preferably 20 through 90%, particularly 40 through 90%, with respect to a total amount of tin and silicon.

When the ratio of tin is too small, since the refractive index is too low, the effect of optical interference is lowered and in correspondence therewith the heat shielding function is also lowered. Furthermore, when the film is formed by a direct current sputtering method in a large area, "arcing" is apt to be generated and, therefore, the applied power is restricted. Therefore, the film forming rate is also lowered, which deteriorates the productivity. When the amount of tin is too large, the refractive index does not decrease so much, the optical interference color becomes conspicuous and the neutral appearance cannot be obtained. Furthermore, change of the color tone becomes conspicuous when the film is overcoated.

The refractive indices of STO films 5, can mainly be controlled by the composition of the target, since the refractive indices depend on the composition of tin and silicon of the target and the sputtering condition. The refractive index of the transparent oxide film of this invention whose major component is tin and silicon can be controlled in a range of 1.5 through 2.0.

The film thickness of STO 5 is not particularly restricted. However, the effect of improving the scratch resistance is recognized to some degree even with the film thickness of 10

Å. In order to impart adequate scratch resistance, the film thickness is usually required to be at least 10 nm, and further improved scratch resistance can be obtained with a film thickness of from 40 to 50 nm. The thicker the film thickness of STO film 5, the more enhanced the scratch resistance. However, when the film thickness is too thick, the change of the color tone becomes conspicuous. Accordingly, the film thickness of the overcoating is pertinently to be 10 through 30 nm.

The Low-E glass employing silver usually has a three-layer structure of ZnO/Ag/ZnO or a five-layer structure of ZnO/Ag/ZnO/Ag/ZnO. In such a case, the outermost layer is ZnO (with a refractive index of about 2.0). Accordingly, it is possible to control the color change by overcoating to the minimum, by adjusting the thickness of the outermost ZnO layer and the refractive index and the thickness of the STO film 5 when the STO film 5 is over-coated.

While the outermost layer of the Low-E glass employing silver is usually an oxide (such as ZnO), the STO film 5 is also an oxide and therefore can be formed by reactive sputtering in the same atmosphere. Accordingly, a Zn target and a Sn-Si type target may be provided in the same chamber, and a ZnO film and a STO film 5 may, for example, be continuously formed.

The STO of this invention whose major component is an oxide containing tin and silicon, is preferably produced by a reactive sputtering method in an atmosphere of oxygen, employing a target wherein tin and silicon are solidified by the CIP method (cold isostatic press method) in view of the production efficiency. However, this invention is not restricted by this production method. The film may be formed from a target of a mixed oxide of tin oxide and silicon oxide. The production may be performed by the vacuum evaporation method the ion plating method, the CVD method or the like.

When the oxide film of this invention whose major component is an oxide containing tin and silicon, is formed by the reactive sputtering method employing a metal target, the film forming rate is fast compared with that of another scratch-resistant oxide film whose major component is an oxide containing zirconium and silicon (Japanese Unexamined Patent Publication No. 289339/1990). For instance, with the same power density applied to a target, in contrast to the case wherein the oxide film is formed by employing Zr—Si (atomic ratio 1:2) target, in case of forming an oxide film by employing a Sn—Si (atomic ratio 1:1) target, the film forming rate is about 2.5 times as fast as the former, and in case of employing a Sn—Si (atomic ratio 8:2) target, about 2.6 times as fast as the former one.

Actually, in case of the Zr—Si series target, a large power density cannot be applied thereto due to "arcing"or the like. Therefore, in case of the Sn—Si series target, a power density approximately 1.6 times as much as that in the Zr—Si series target, can be applied. Accordingly, when power as large as possible is applied to a target, the film forming rate employing the Sn—Si series target is about four times as much as that employing the Zr—Si series target, which is extremely effective in view of the production efficiency.

In the present invention, the Low-E film employing silver has the scratch resistance improved by the overcoat. Various films may be conceivable for such an overcoat film. However, the oxide film whose major component is an oxide containing tin and silicon in the present invention, has features such that 1) reactive DC sputtering from metal targets can be conducted under a stabilized condition, and the film-forming speed is high, 2) the refractive index can be varied within a range of from 1.5 to 2.0 by adjusting the target composition, and 3) it is hard as compared with $SnO_2$.

DETAILED DESCRIPTION OF THE PREFERRED EMBODIMENTS

Figure 1:
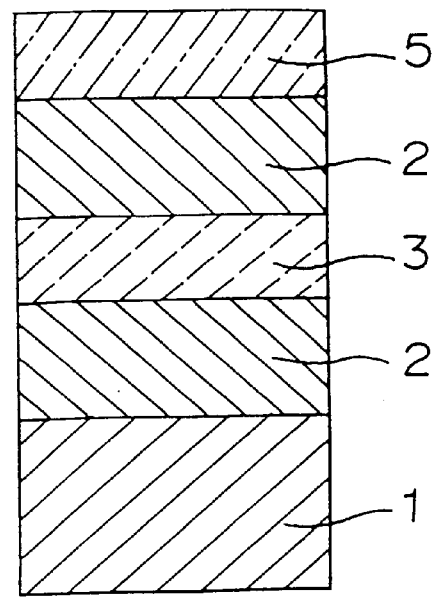
FIG. 1 is a sectional diagram of an example of a functional product of this invention.
Figure 2:
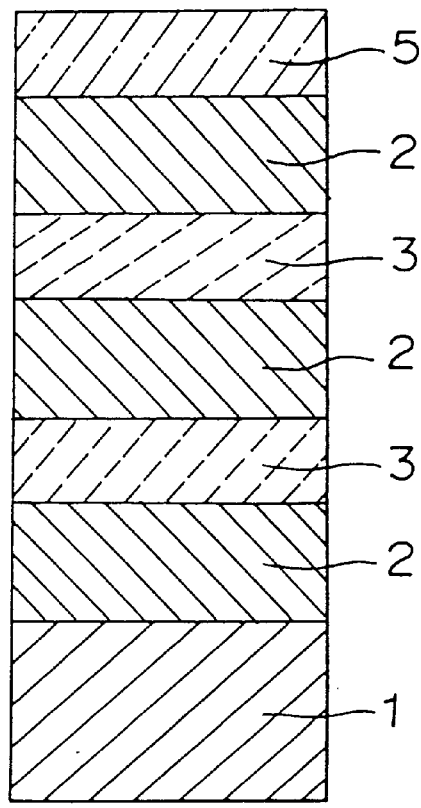
FIG. 2 is a sectional diagram of another example of a functional product of this invention.
Figure 3:
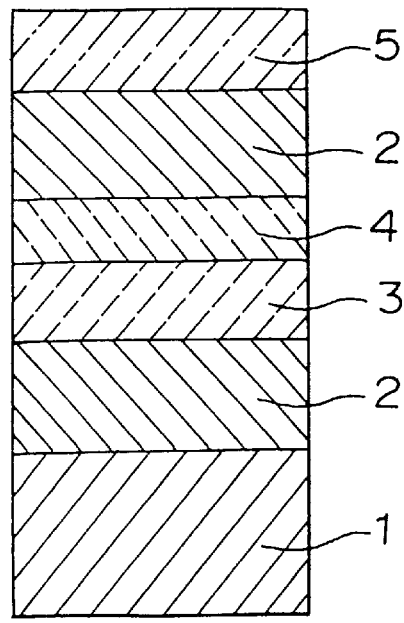
FIG. 3 is a sectional diagram of another example of a functional product of this invention.
Figure 4:
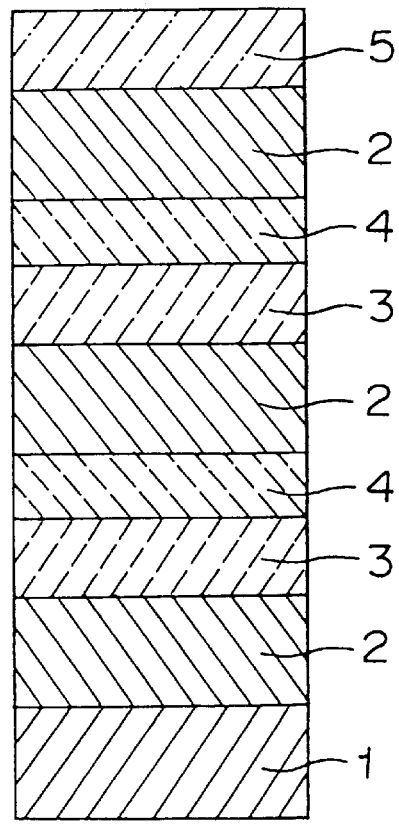
FIG. 4 is a sectional diagram of another example of a functional product of this invention.

Now, the present invention will be described in further detail with reference to Examples. However, it should be understood that the present invention is by no means restricted to such specific Examples.

EXAMPLE 1

A washed float glass plate having thickness of 2 mm was set in a sputtering device. The air in the device was discharged to a pressure of $10^{-6}$ Torr. Next, an oxygen gas was introduced in the device thereby elevating the pressure to $2\times10^{-3}$ Torr. A metal target of Zn was sputtered with a power density of 5.2 $W/cm^2$, to form a ZnO film (first layer) having a thickness of 40 nm.

Then, the gas was changed to argon, the pressure was adjusted to $2\times10^{-3}$ Torr, and a silver target was sputtered with a target power density of 0.8 $W/cm^2$ to form a silver film (second layer) in a thickness of 15 nm.

Then, the gas was again changed to an oxygen gas, and a ZnO film (third layer) was formed in a thickness of 20 nm under the same conditions as for the first layer.

Finally, the gas was changed to a gas mixture of argon and oxygen (flow ratio of 1:1), the pressure was adjusted to $2\times10^{-3}$ Torr, and an alloy target of Sn and Si (atomic ratio of 1:1) was sputtered with a power density of 7.8 $W/cm^2$ to form an oxide film (fourth layer) having an atomic ratio of Sn to Si of 1:1 and a refractive index of about 1.7 in a thickness of 10 nm. This film will be referred to as STO-1.

EXAMPLE 2

By the same method and under the same conditions as in Example 1, ZnO/Ag/ZnO were formed on a float glass substrate having a thickness of 2 mm. The film thicknesses were 40 nm, 10 nm and 80 nm, respectively. Then, in the same manner, a silver film (fourth layer) and a ZnO film (fifth layer) were formed in thicknesses of 10 nm and 10 nm, respectively. Thereafter, by the same method and under the same conditions as in the case of the fourth layer in Example 1, STO-1 (sixth layer) was formed in a thickness of 10 nm.

EXAMPLE 3

In the same manner as in Example 1, the first layer and the second layer were formed. Then, while maintaining the gas to be argon, the pressure was adjusted to $2\times10^{-3}$ Torr, and the zinc target was sputtered with a power density of 3.0 $W/cm^2$ to form a zinc film (barrier layer) in a thickness of 5 nm. Then, the gas was changed to an oxygen gas, the pressure was adjusted to $2\times10^{-3}$ Torr, and a zinc target was sputtered with a power density of 5.2 $W/cm^2$ to form a ZnO film (third layer) in a thickness of 20 nm. Finally, the gas was changed to a gas mixture of argon and oxygen (flow ratio of 1:1), and an alloy target of Sn and Si (atomic ratio of 1:1) was sputtered with a power density of 7.8 W/cm² to form STO-1 (fourth layer) in a thickness of 10 nm.

EXAMPLE 4

By the same method and under the same conditions as in Example 3, ZnO/Ag/Zn (barrier layer)/ZnO were formed on a float glass substrate. The film thicknesses were 40 nm, 10 nm, 5 nm and 80 nm, respectively. Then, in the same manner, a silver film (fourth layer), a zinc film (barrier layer) and a ZnO film (fifth layer) were formed in thicknesses of 10 nm, 5 nm and 10 nm, respectively. Thereafter, by the same method under the same conditions as in the case of the fifth layer in Example 3, STO-1 (sixth layer) was formed in a thickness of 10 nm.

EXAMPLE 5

By the same method and under the same conditions as in Example 1, ZnO/Ag/ZnO were formed on a float glass substrate having a thickness of 2 mm. Then, the gas was changed to a gas mixture of argon and oxygen (flow ratio of 1:1), the pressure was adjusted to $2\times10^{31\ 3}$ Torr, and an alloy target having an atomic ratio of Sn to Si of 2:8, was sputtered with a power density of 7.8 W/cm² to obtain an oxide film (fourth layer) having an atomic ratio of Sn to Si of 2:8 and a refractive index of about 1.6 in a thickness of 10 nm. This film will be referred to as STO-2.

COMPARATIVE EXAMPLE 1

By the same method and under the same conditions as in Example 1, ZnO/Ag/ZnO were formed in the same film thicknesses as in Example 1 on a float glass substrate having a thickness of 2 mm.

COMPARATIVE EXAMPLE 2

By the same method and under the same conditions as in Example 1, ZnO/Ag/ZnO were formed in the same thicknesses as in Example 1 on a float glass substrate having a thickness of 2 mm. Then, a gas mixture of argon and oxygen (flow rate of 1:1) was introduced into the chamber, the pressure was adjusted to $2\times10^{31\ 3}$ Torr, and the tin target was sputtered with a power density of 7 W/cm² to form a $SnO_2$ film (fourth layer) in a thickness of 10 nm.

COMPARATIVE EXAMPLE 3

By the same method and under the same conditions as in Example 1, ZnO/Ag/ZnO were formed on a float glass substrate having a thickness of 2 mm. The film thicknesses were 40 nm, 10 nm and 80 nm, respectively. Then, in the same manner, a silver film (fourth layer) and a ZnO film (fifth layer) were formed in thicknesses of 10 nm and 10 nm, respectively.

COMPARATIVE EXAMPLE 4

By the same method and under the same conditions as in Example 3, ZnO/Ag/Zn (barrier layer) were formed on a float glass substrate. The thicknesses of the respective films were the same as in Example 3.

COMPARATIVE EXAMPLE 5

By the same method and under the same conditions as in Example 3, ZnO/Ag/Zn(barrier layer)/ZnO were formed on a float glass substrate. The film thicknesses were 40 nm, 10 nm, 5 nm and 80 nm, respectively. Further in the same manner, a silver film (fourth layer), a zinc film (barrier layer) and a ZnO film (fifth layer) were formed in thicknesses of 10 nm, 5 nm and 10 nm, respectively.

With respect to various Low-E glasses thus obtained, abrasion resistance of the film surface was examined by a Taber abrasion test and an abrasion test employing a powder (the powder abrasion test). The Taber abrasion test was conducted with 100 rotations under a load of 500 g. The powder abrasion test was conducted as follows. Namely, the Low-E glass prepared, was fixed so that the film surface faced up. A powder was sprayed from above, and another float glass sheet was overlaid. While exerting a load (150 g/cm²) to the overlaid glass sheet, the Low-E glass was reciprocated at constant strokes. The results are shown in Table 1. The change in the visible light transmittance as between before and after the Taber abrasion test was measured by a simple transmittance meter 304 Model, manufactured by Asahi Bunko K.K.

|  | Layered structures | Change in the visible light transmittance after the Taber abrasion test | Presence or absence of scratch marks on the film surface after the powder abrasion test |
|---|---|---|---|
| Example 1 | Glass/ZnO(40 nm)/Ag(l5 nm)/ZnO(20 nm)/STO-1(10 nm) | 13.8% | Absence |
| Example 2 | Glass/ZnO(40 nm)/Ag(10 nm)/ZnO(80 nm)/Ag(10 nm)/ZnO(10 nm)/STO-1(10 nm) | 12.0% | Absence |
| Example 3 | Glass/ZnO(40 nm)/Ag(l5 nm)/Zn(5 nm)/ZnO(20 nm)/STO-1(10 nm) | 10.5% | Absence |
| Example 4 | Glass/ZnO(40 nm)/Ag(10 nm)/Zn(5 nm)/ZnO(80 nm)/Ag(10 nm)/Zn(5 nm)/ZnO(l0 nm)/STO-1(l0 nm) | 10.0% 10.0% | Absence Absence |
| Example 5 | Glass/ZnO(40 nm)/Ag(15 nm)/ZnO(20 nm)/STO-2(10 nm) | 14.3% | Absence |
| Comparative Example 1 | Glass/ZnO(40 nm)/Ag(15 nm)/ZnO(20 nm) | 21.2% | Presence |
| Comparative Example 2 | Glass/ZnO(40 nm)/Ag(15 nm)/ZnO(20 nm)/$SnO_2$(10 nm) | 15.0% | Presence |
| Comparative Example 3 | Glass/ZnO(40 nm)/Ag(10 nm)/ZnO(80 nm)/Ag(10 nm)/ZnO(10 nm) | 21.0% | Presence |
| Comparative Example 4 | Glass/ZnO(40 nm)/Ag(15 nm)/Zn(5 nm)/ZnO(20 nm) | 19.7% | Presence |
| Comparative Example 5 | Glass/ZnO(40 nm)/Ag(10 nm)/Zn(5 nm)/ZnO(80 nm)/Ag(10 nm)/Zn(5 nm)/ZnO(10 nm) | 19.0% | Presence |

The silver-type Low-E glass of the present invention can be produced by an automated system without manual operation. Especially, mounting of the substrate on the production line and removal of the product from the production line can be automated, whereby the production efficiency can be improved, and the production cost can be reduced. The oxide film whose major component is an oxide containing tin and silicon, as used as a protective coating in the present invention, is free from arcing during the sputtering, and the film-forming speed is high. Accordingly, by placing the target for this oxide film at the final stage of the production line and sputtering it, continuous production in one pass mode is possible. Further, with the oxide film whose major component is an oxide containing tin and silicon, the refractive index can be varied within a range of from 1.5 to 2.0. Accordingly, by using a film having a low refractive index as a protective coating, it is possible to control the optical property such as the color due to the protective coating to the minimum level.

What is claimed is:

1. A method comprising the steps of:
    sputtering a target, to form an outermost layer of a functional product,
    wherein said functional product comprises at least one oxide layer and at least one layer comprising silver, alternately laminated on a substrate in a total of (2n+1) layers, wherein n≧1, said outermost layer comprises' an oxide containing tin and silicon,
    a ratio of tin defined as Sn/(Sn+Si) of said outermost layer is 40–90% in atomic ratio, and
    said sputtering is direct current sputtering.

2. The method of claim 1, wherein the (2n+1) layers consist of an oxide layer, a layer comprising silver and an oxide layer sequentially laminated on the substrate.

3. The method of claim 1, wherein the (2n+1) layers consist of an oxide layer, a layer comprising silver, an oxide layer, a layer comprising silver and an oxide layer, sequentially laminated on the substrate.

4. The method of claim 1, wherein the refractive index of visible light of the outermost layer is in a range of 1.5 through 2.0.

5. The method of claim 1, wherein the outermost layer has a thickness of from 1 nm to 50 nm.

6. The method of claim 1, wherein a metal layer is formed between a layer comprising silver and an oxide layer.

7. The method of claim 1, wherein said substrate is float glass.

8. The method of claim 1, wherein each said layer comprising silver has a thickness of from 5–25 nm.

9. The method of claim 1, wherein each said oxide layer has a thickness of from 10–18 nm.

10. The method of claim 1, wherein each said layer comprising silver further comprises an element selected from a group consisting of palladium, aluminum and copper.

11. The method of claim 6, wherein said metal layer comprises a metal selected from the group consisting of Zn, Ti, Cr, Sn, Ni and stainless steel.

12. The method of claim 6, wherein said metal layer has a thickness of from 1–5 nm.

13. A method comprising the steps of:
    sputtering a target, to form an outermost layer of a functional product,
    wherein said functional product comprises at least one oxide layer and at least one layer comprising silver alternately laminated on a substrate in a total number of (2n+1) layers, wherein n≧1, said outermost layer comprises an oxide containing tin and silicon,
    a barrier layer is formed between a layer comprising silver and an oxide layer,
    said barrier layer comprises a material selected from the group consisting of silicon nitride, aluminum nitride and BN, and
    said sputtering is direct current sputtering.

14. The method of claim 1, further comprising the step of spraying a resin powder on said functional product.

15. The method of claim 1, wherein said sputtering is reactive sputtering.

16. The method of claim 1, further comprising the step of preparing said target by cold isostatic press method.

17. The method of claim 1, wherein said target is a metal target.

18. The method of claim 1, wherein said sputtering has a film forming rate at least 2.5 times as fast as a sputtering film forming rate of an oxide target containing zirconium and silicon in the atomic ratio of 1:2 under identical sputtering conditions.

19. The method of claim 1, wherein a power density during said sputtering is greater than a sputtering power density which will cause an oxide target containing zirconium and silicon, in the atomic ratio of 1:2, to arc.

20. The method of claim 13, wherein a ratio of tin defined as Sn/(Sn+Si) of said outermost layer is 40–90% in atomic ratio.

* * * * *